United States Patent [19]

Walker

[11] 3,918,030

[45] Nov. 4, 1975

[54] GENERAL PURPOSE DIGITAL COMPUTER

[76] Inventor: Richard L. Walker, P.O. Box 7344, San Diego, Calif. 92107

[22] Filed: Aug. 31, 1973

[21] Appl. No.: 393,704

[52] U.S. Cl. .......... 340/172.5
[51] Int. Cl.² .......... G06G 9/00
[58] Field of Search .......... 340/172.5; 445/1

[56] References Cited

UNITED STATES PATENTS

| | | | |
|---|---|---|---|
| 3,745,533 | 7/1973 | Erwin et al. | 340/172.5 |
| 3,760,369 | 9/1973 | Kemp | 340/172.5 |
| 3,798,606 | 3/1974 | Henle et al. | 340/172.5 |

*Primary Examiner*—Harvey E. Springborn
*Attorney, Agent, or Firm*—R. S. Sciascia; G. J. Rubens; T. M. Phillips

[57] ABSTRACT

Digital computer apparatus having a plurality of individual and independent instruction decoders for the replication of functions. Each decoder comprises a separate package which responds to one and only one instruction. Memory, timing, and accessable registers are bussed to the decoders. The number of instruction packages required is dictated by system criteria, and can exceed 200. A standardized input/output unit is utilized in the apparatus.

1 Claim, 4 Drawing Figures

~ PRIOR ART ~

GENERAL PURPOSE DIGITAL COMPUTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Computer users presently can select from various general purpose digital data computers furnished by at least seven different manufacturers. Each family of general purpose computers has a specific instruction repertoire and compiler or similar system. The resulting variety in computers and peripheral equipment is attributable, in part, to the arguments of systems designers that no single computer nor instruction set can fulfill all ADP system requirements. Consequently hardware and software support are developed on a case by case basis, whereby the cost of system maintenance and personnel training increases in a linear fashion each time a different system is implemented. Furthermore, software programs, both operational and maintenance, are usually not compatible with systems other than those for which they were specifically designed. Also, personnel must be retrained to assume software design or maintenance responsibilities. Finally, hardware spares for each system are unique, thus requiring the stocking of numerous cards, components, etc., for each of the several general purpose computers.

In order to fully appreciate the universal GP computer concept to be disclosed, prior art computer functions will be briefly explained with respect to FIG. 1. In FIG. 1, a GP computer apparatus is shown in simplified form. The general purpose computer of FIG. 1 may be of the type shown in FIG. 2 of U.S. Pat. No. 3,251,040. The key component of the apparatus is the instruction decoder (ID) 10. All instructions existing in the core memory (CM) 12 are interpreted in the ID. The original computer hardware design determines how the computer operates on data in the CM or in the REGISTERS (R) 14. The layout and logical format of the ID constrains the instruction repetoire to an original instruction set decided upon at the time of computer design.

The fact that instruction sets vary for each existing computer is the major source of incompatibility, especially in view of the variety of existing computer systems. The input/output control unit (I/O) 16 also contributes to incompatibility, but not to the extent of the instruction sets.

For purposes of explanation, a sequential program access will be assumed. That is, each program instruction will be selected by the program register (PREG) 18 in numerical order. For example, if the first instruction in memory at address is 10000, then, the PREG will automatically select 10001 as the next instruction to be used. Furthermore, it will be assumed that the program will have "stopped" when the last instruction has been called and used, i.e., executed.

A simplified, hypothetical addition operation can be described as follows. By operator selection, the hardware I/O program (HIP) 22, in conjunction with the timing unit 24 sends an orderly sequence of instructions to the I/D 10. The ID, in response thereto, commands the input/output control (IOC) 16 to load information into the memory 12 via an I/O channel specified by the operator.

Upon completion of information load, the HIP 22 receives notification from the IOC 16 and stops. Indicator lights on the computer front panel advise the operator that the information (i.e., program) is in the memory 12 and is ready to function as the logical control for operation.

In order to start the program, the operator must have a prior knowledge of the program content, purpose, and capability. Knowing this, he must then do the following:

1. Enter the program start address in an operator addressable register 14;
2. Enter parameters that the program must have to perform the task and which were not previously loaded;
3. Actuate a "start" switch to initiate the timing unit 24 sequence in the computer.

When the START is actuated, the PREG draws the first instruction, ($n$), to be executed and makes it available to the ID for interpretation. For purposes of illustration, it will be assumed that this instruction is a command to take a number from a location in the memory and transfer it to the register R1. The ID will access the memory and transfer this number to R1. Assuming that the second instruction, ($n+1$), is also a command to take a number from a location in the memory and transfer it to the register R2, the ID will very nearly repeat the performance as specified by instruction ($n$). There are now two numbers in the registers, and all that remains to be performed is the add function, and to store or place the result in a defined location in the computer. It will be assumed that the store location is another address in the memory.

The next instruction, ($n + 2$is now drawn into PREG and presented to the ID. This instruction will be assumed to be and ADD CONTENTS OF R1 TO R2, THEN STORE IN MEMORY. The ID first transfers the content of R1 to an operating register in the arithmetic (ARITH) unit 20, and then it transfers the contents of R2 to another operating register in ARITH. The ID then commands the ARITH unit to perform an addition on the contents of the operating register. When the addition is complete, the ID transfers the result back to R1 or directly to a location in the memory.

If it is assumed that the add instruction is the last required operation, then the program will stop and the operator will be so notified via front panel indicator lights. This is not the typical case, as a number or answer contained in the memory is of little use to the operator, and the answer must be outputted on another I/O channel to come type of visual display such as a CRT display, or a paper printer.

It should be noted that in the above discussion, the ID reacts to an instruction and that it is a single logic device. It is a specific combination of logic functions designed to accommodate a variety of inputted instructions. This type of design has evolved from the necessity to create a diverse instruction capability in a minimum space, weight and power consumption configuration. This minimum configuration was absolutely necessary because of the state-of-the-art in vacuum tubes, and later, discrete, component solid state devices.

The advent of Large Scale Integrated circuits (LSI) now places the size, power, and most of all, the cost of separate instruetion decoders within the realm of feasibility. Such direction is embodied in the present concept to be disclosed herein because of the relative ease with which the instruction set may be changed. That is, LSI will allow the development of a general-purpose computer which can have an instruction set which is expandable to meet any processing requirement or which may have any unique instruction that a user may require without redesigning the basic computer.

SUMMARY OF THE INVENTION

A universal general purpose digital computer is disclosed. In existing digital computers, the essence of all operations is a single instruction decoder which interprets all of the instructions existing in a core memory. The operation or processing of data in the core memory or registers is a function of the original computer design. Layout and logical format of the instruction decoder constrains the instruction repertoire to an original set decided upon at the time of the design whereby the variance of instruction sets from computer to computer is a major source of incompatibility.

The disclosed general purpose computer utilizes a plurality of individual and independent (of each other) decoders wherein each decoder responds to one and only one instruction. Memory, timing, and accessable registers are bussed to the decoders which comprise separate packages. The computer can have as many instruction packages as required by system design criteria. The full repertoire of instructions can exceed 200, and on a plug-in basis, the computer can have as few as 10 instructions for a simple communications preprocessor or as many as 75 instructions for a complex real-time command and control system. The input/output unit comprises a standardized device.

STATEMENT OF THE OBJECTS OF THE INVENTION

It is the primary object of the present invention to provide a general purpose digital computer for universal applications with its attendant advantages and benefits.

Other objects, advantages and novel features of the invention will become apparent from the following detailed description of the invention when considered in conjunction with the accompanying drawings.

DESCRIPTION OF THE PREFERRED EMBODIMENT

Figure 1:
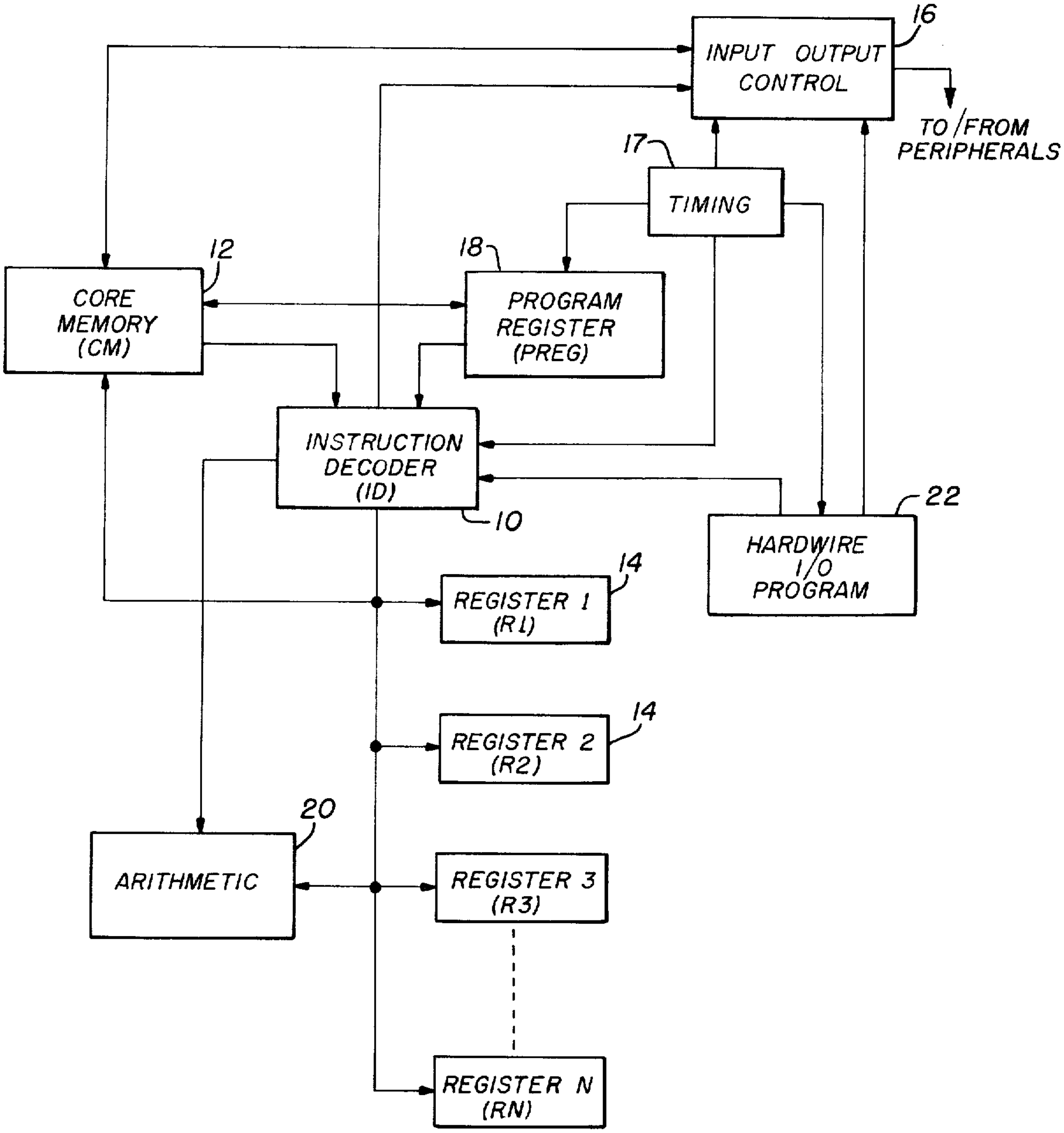
FIG. 1 is a simplified block diagram of a prior-art general purpose digital computer.
Figure 2:
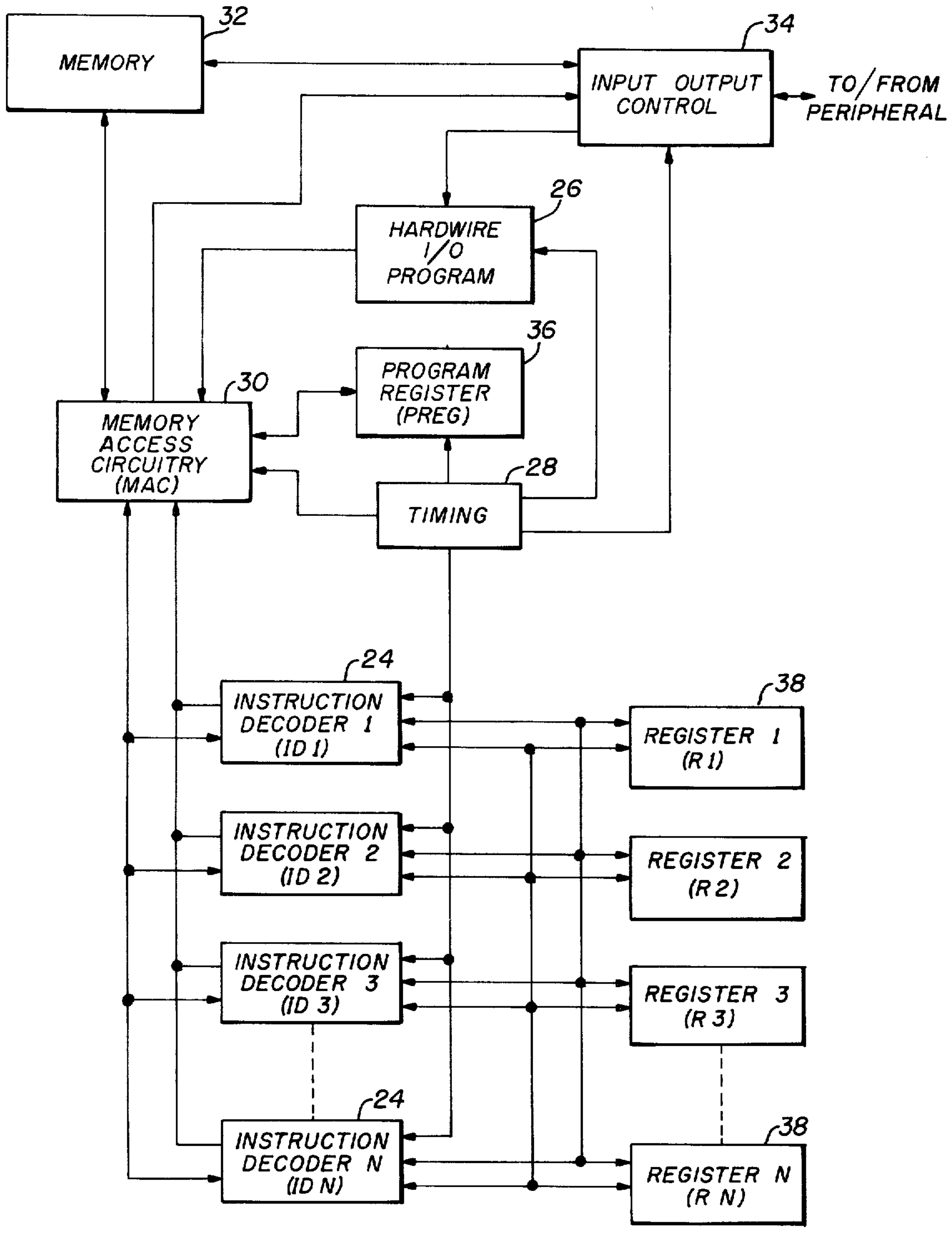
FIG. 2 is a simple block diagram of the proposed universal general purpose digital computer.

In the embodiment of the inventive concept shown in FIG. 2, the single ID of FIG. 1 has been replaced with several separate ID's, ID-1 through ID-N. Whereas the logic functions in the ID 10 of FIG. 1 overlap, are interdependent, and some portions of the ID are common to the interpretation of all instructions, each of the several ID's 24 in the system of FIG. 2 interprets a single instruction. There is no commonality between the ID's 24, and each of the ID's is independent of all the others. Hence, they may be exchanged, added, or arranged to suit a specific user requirement.

For purposes of explanation, as in the description of the prior art, a sequential program access will be assumed and the example given will be load and add functions. A hypothetical addition can be described as follows.

By operator selection, the hardwire I/O program (HIP) 26 in conjunction with the timing unit 28 section commands the memory access circuitry 30 (MAC) to begin program execution. The timing unit 28 controls the progression of memory 32 instructions from the MAC to the individual ID's, ID-1 through ID-N. For each instruction that is presented to the ID's only one of the N ID's will react. In the case of the HIP 26 only the I/O ID's would respond.

The operator selection of HIP also sets the mode of the MAC 30, so that all output control signals from the responding ID's bypass the memory 32 and are sent directly to the input/output control (IOC) 34. The IOC interprets information from the peripherals and determines when the information input should cease. When this occurs, the IOC directly informs the HIP 26 to stop. The operator is notified via front panel indicators that the information load has been completed.

In order to "start" the program, the operator must have a prior knowledge of the program content, purpose, and capability. The operator must then perform the following:

1. Enter the program start address in an operator addressable register;
2. Enter parameters that the program must have to perform the task and which were not loaded with the program;
3. Actuate a "start" switch of some type which initiates the timing sequence in the computer.

When the start is actuated, the PREG 36 informs the MAC 30 of the memory location of the first, ($n$), instruction. For the duration of the program execution, the MAC increments the PREG and accesses memory 32 in response to commands received from the ID's. In the instruction presentation phase, the instruction is sent via the MAC to the ID's where the appropriate ID will recognize the instruction and react accordingly.

Again, as in the prior art explanation, the instructions assumed to be in memory are:

1. $n$ = first instruction = FETCH OPERAND FROM LOCATION IN MEMORY AND PLACE IN REGISTER-1 (R1).
2. $n+1$ = second instruction = FETCH OPERAND FROM LOCATION IN MEMORY AND PLACE IN REGISTER-2 (R2).
3. $n + 2$ = third instruction = ADD CONTENTS OF R(1) TO R(2), THEN STORE RESULT IN MEMORY.

Figure 3:
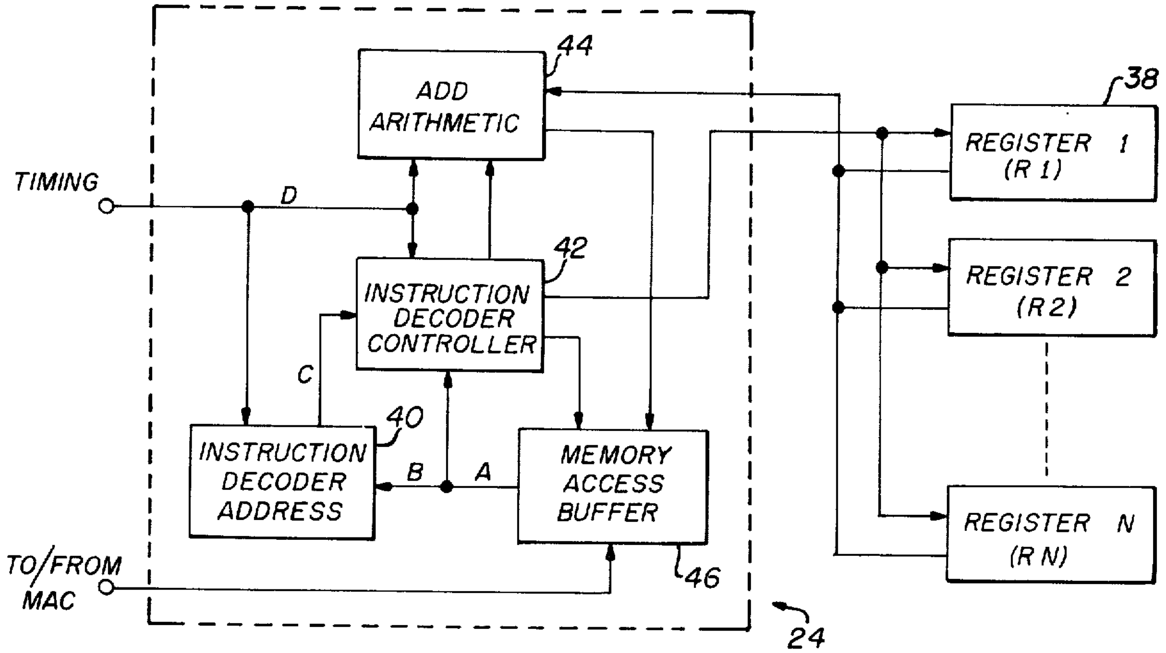
FIG. 3 represents a typical instruction decoder of the type utilized with a computer as shown in FIG. 2.

Instruction ($n$) when seen by the appropriate ID will create a positive compare in the instruction decode address (IDA) 40, shown in FIG. 3 which illustrates an ADD ID. The ID responding to instruction ($n$) would not contain an arithmetic section, but would contain control signals and word generation mechanisms to perform the fetch from the memory 32. The ID action for instruction ($n$) will be to enable the MAC to access the memory, and then take the accessed word and place it in R-1.

Instruction ($n + 1$), will create a repeat of instruction ($n$), except that the destination will be R-2.

Instruction ($n + 2$), (ADD CONTENTS OF R1 TO R2, THEN STORE RESULT IN MEMORY), will create a different sequence of operations. The ADD function will occur first, then a control signal will be sent to MAC stipulating where the result is to be placed in the memory 32. With reference to FIG. 3, the following is a description of ($n + 2$) execution.

The instruction will be sensed by the IDA 40, and the ID controller (IDC) 42 will be notified that in accordance with received timing pulses, it is to execute instruction ($n + 2$). The execution is assumed to take place under a four-phase timing signal as follows:

Phase 1:
- a. IDA 40 recognizes its own ID address in instruction;
- b. ID controller 42 sequence starts;
- c. ID controller reads R-1 definition field in instruction; and,
- d. ADD ARITH (AA) 44 "reads in" content of R-1.

Phase 2:
- a. ID controller reads R-2 definition field in instruction;
- b. AA logically adds contents of R-2 to contents of R-1 already held in AA; and,
- c. AA result present in memory access buffer (MAB) 46.

Phase 3: ID controller sets MAB 46 control lines to MAC.

Phase 4: MAB 46 sends result and store address to MAC 30 for memory storage.

As before, the result stored in the memory is of little value to the operator, and a data output would normally follow the completion of the program execution.

In the above description, the ID's are separate and each ID responds to only one instruction. The memory, timing and register's are bussed to the decoders. In hardware implementation, each decoder would be a separate package, and the computer would have as many instruction packages (decoders) as the system designer required.

On a plug-in basis and using a modular approach, the number of instructions possible is limited only by the number of plub-in sockets in the hardware. A computer could have as few as ten instructions for a simple communications preprocessor, or as many as 75 instructions for a complex, real-time, command and control program. Since all instructions are independent, special instructions may be added at any time to the computer without hardware interference.

Figure 4:
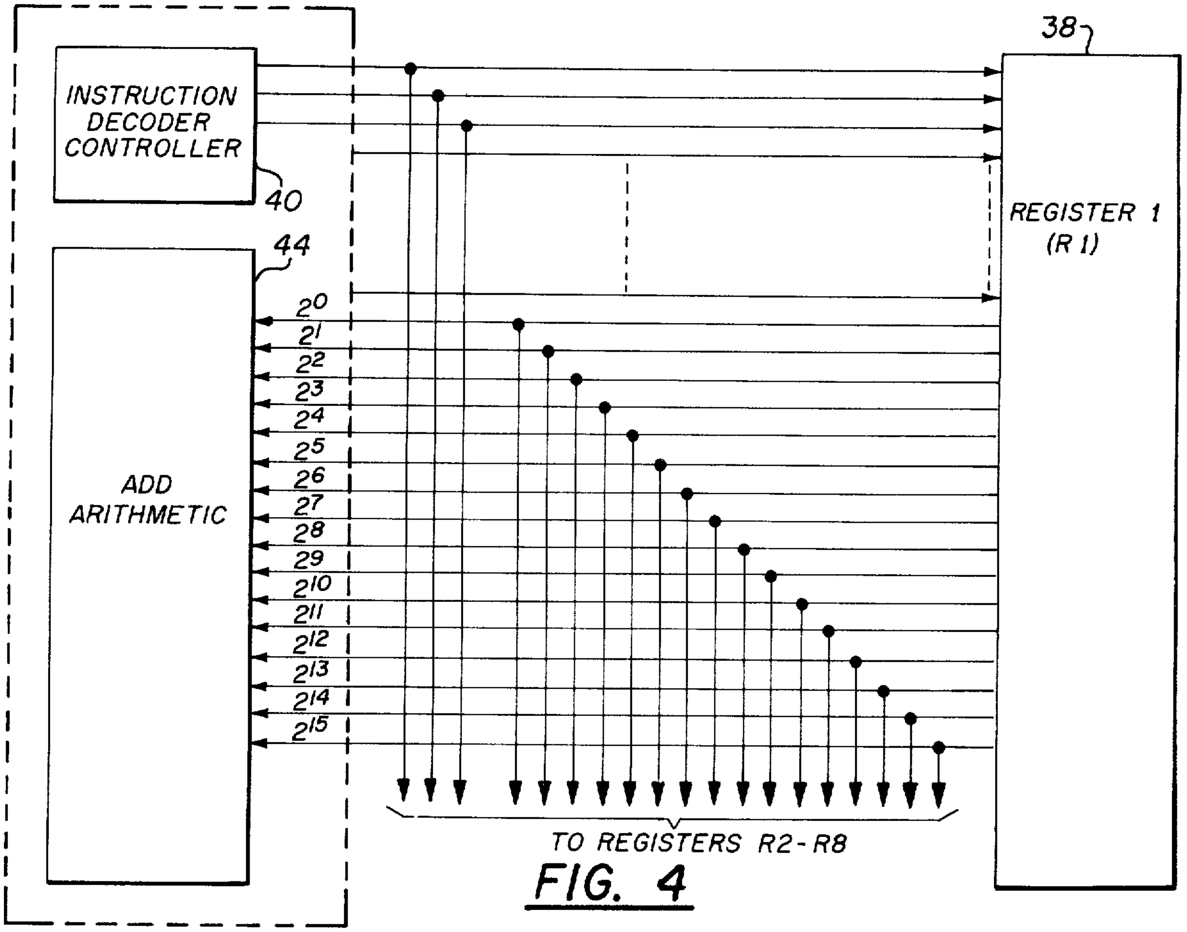
FIG. 4 illustrates line control and data lines of a portion of the circuit of FIG. 3.

It should be noted that FIGS. 1, 2, and 3 illustrate singleline control and data flow paths. In fact, a single line may represent several control lines and several data lines. FIG. 4 shows design details of one portion of FIG. 3 and illustrates the actual interconnection paths.

With reference to FIG. 4, a data buss of 16 binary data "bits" is illustrated, at three bits, thereby allowing a maximum of eight registers to be accessed. The input lines to the registers are not used, but are brought out to the ID card socket so that any ID may be placed in the socket, including one that is required to place an instruction result into a register.

Thus it can be seen that in the GP computer of FIGS. 2, 3, and 4, the arithmetic and decoding functions are performed by several separate decoders. Each instruction in memory is handled and executed by a different decoder. In a modular design, each decoder can be a separate card which plugs into a serial or a parallel buss. As shown in the ID block diagram of FIG. 3, the lines to/from MAC, and the lines interconnecting the memory access buffer and the function registers represent several parallel lines with each line containing a bit of information. This type of design would provide for parallel data transfer between the MAC and the ID.

Whereas with the prior art, the replication of functions such as separate arithmetic or instruction decoders for individual instructions would have been impossible due to cost, space, weight and power parameter tradeoffs, with the advent of the LSI technology, these parameter tradeoffs now favor such duplication of functions because of the universability in application and computer software that is offerred by such an approach.

The general purpose digital computer disclosed herein as having separate instruction decoder hardware will allow complete freedom in the possible number of instructions in the instruction set, or, in the development of unique instructions for a specific user. A single computer design will further allow a wide range of tasks to be performed and at the same time match the hardware and software size to the magnitude of the data processing task.

Obviously many modifications and variations of the present invention are possible in the light of the above teachings. It is therefore to be understood that within the scope of the appended claims the invention may be practiced otherwise than as specifically described.

What is claimed is:

1. In general purpose digital computer apparatus of the type having a memory section, input/output section, arithmetic section and a control section, the improvement providing for a variable instruction repertoire in for the control and arithmetic sections comprising:
- a. a plurality of instruction decoders being connected in a parallel independent manner with respect to each other,
- b. each of said instruction decoders having means connected to said memory section for receiving instructions from and providing instructions to said memory section,
- c. each of said instruction decoders having an assigned address whereby the instructions stored in said computer section and received by of said instruction decoders will be executed only by the instruction decoder having an assigned address which is the same address as that included in said stored instructions.

* * * * *